United States Patent
Lee

(10) Patent No.: US 7,616,721 B2
(45) Date of Patent: Nov. 10, 2009

(54) APPARATUS AND METHOD FOR CHECKING NETWORK SYNCHRONIZATION CLOCK SIGNAL IN COMMUNICATION SYSTEM

(75) Inventor: Tae-Young Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 558 days.

(21) Appl. No.: 11/635,673

(22) Filed: Dec. 8, 2006

(65) Prior Publication Data

US 2007/0165760 A1 Jul. 19, 2007

(30) Foreign Application Priority Data

Jan. 18, 2006 (KR) ...................... 10-2006-0005555

(51) Int. Cl.
*H04L 7/00* (2006.01)

(52) U.S. Cl. .................. 375/354; 375/355; 375/357; 375/359; 375/360; 375/371; 375/373; 375/375; 702/69; 702/76; 702/77; 702/78; 369/53.34; 369/47.28; 369/44.13; 369/275.4

(58) Field of Classification Search ............... 375/354, 375/355, 356, 357, 359, 360, 371, 373, 375
See application file for complete search history.

(56) References Cited

FOREIGN PATENT DOCUMENTS

| EP | 0 610 052 | 8/1994 |
|----|-----------|--------|
| JP | 60-224344 | 11/1985 |
| JP | 2-166918 | 6/1990 |
| KR | 1997-55383 | 7/1997 |
| KR | 10-1999-0060348 | 7/1999 |
| KR | 1999-0061650 | 7/1999 |

*Primary Examiner*—Chieh M Fan
*Assistant Examiner*—Siu M Lee
(74) *Attorney, Agent, or Firm*—Robert E. Bushnell, Esq.

(57) ABSTRACT

In an apparatus and method for checking a network synchronization clock signal in a communication system, the apparatus generates a divided clock signal which is the same as an externally inputted network synchronization clock signal, compares the value of one period of the network synchronization clock signal to the value of one period of the divided clock signal, and determines whether the network synchronization clock signal is normal or not. Thus, the reliability of an operation of checking the network synchronization clock signal is enhanced.

20 Claims, 4 Drawing Sheets

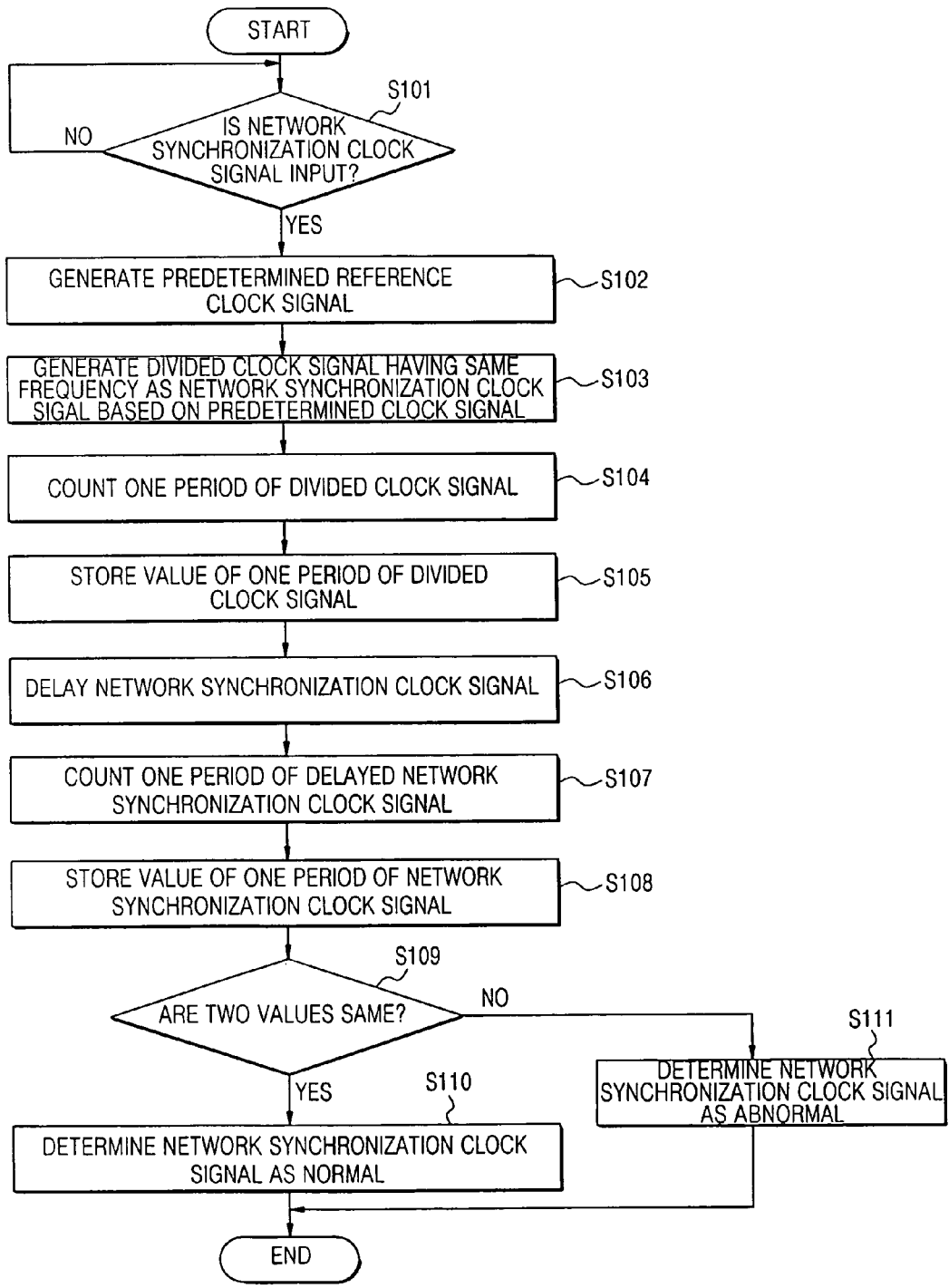

APPARATUS AND METHOD FOR CHECKING NETWORK SYNCHRONIZATION CLOCK SIGNAL IN COMMUNICATION SYSTEM

CLAIM OF PRIORITY

This application makes reference to, incorporates the same herein, and claims all benefits accruing under 35 U.S.C.§19 from an application for APPARATUS AND METHOD FOR A NETWORK SYNCHRONIZATION CLOCK CHECKING OF COMMUNICATION SYSTEM earlier filed in the Korean Intellectual Property Office on Jan. 18, 2006 and there duly assigned Ser. No. 10-2006-0005555.

BACKGROUND OF THE INVENTION

1. Technical Field

The present invention relates to an apparatus and method for checking a network synchronization clock signal in a communication system.

2. Related Art

In a typical network synchronization system, a communication system performs an operation in synchronization with a network synchronization clock signal received from a switching network.

The communication system includes a circuit which determines whether the network synchronization clock signal is normal or not, and outputs the result. That is, the communication system analyzes whether the network synchronization clock signal is normal or not, and is synchronized with a clock signal determined to be a normal network synchronization clock signal.

A network synchronization clock checking apparatus of the communication system includes a coefficient adjusting circuit and a multivibrator.

In this regard, the coefficient adjusting circuit is embodied by a resistor and a condenser. This coefficient adjusting circuit generates a predetermined coefficient through the resistor and the condenser so that a clock signal, which is supposed to descend from '1' to '0,' remains '1.'

The multivibrator receives a network synchronization clock signal received by the communication system, checks the network synchronization clock signal, and outputs the result.

The network synchronization clock checking apparatus having the above-described circuit configuration operates the coefficient adjusting circuit, and generates a predetermined coefficient until a network synchronization clock signal input to the multivibrator is lowered from '1' to '0' and then elevated from '0' to '1' again, so that the network synchronization clock signal input to the multivibrator remains '1.' That is, the network synchronization clock checking apparatus allows the multivibrator to keep outputting '1' when the network synchronization clock signal is normally inputted to the multivibrator without a break.

Furthermore, the network synchronization clock checking apparatus allows the multivibrator to output '0' when the network synchronization clock signal is abnormally interrupted.

However, the network synchronization clock checking apparatus of the communication system senses only a level transition made by the network synchronization clock signal inputted to the multivibrator, and determines whether the network synchronization clock signal is normal or not. Accordingly, even if the input network synchronization clock signal is abnormal, the network synchronization clock checking apparatus may determine that the clock signal is normal on the basis of a level transition.

Moreover, because the coefficient adjusting circuit of the network synchronization clock checking apparatus includes the resistor and the condenser, an error in the coefficient obtained through the resistor and the condenser may occur due to the defects and erroneous values of respective components.

SUMMARY OF THE INVENTION

It is an object of the present invention to provide an apparatus and method for checking a network synchronization clock signal in a communication system so as to prevent a case wherein the communication system determines that the network synchronization clock signal is normal even when the network synchronization clock signal is abnormal.

A first aspect of the present invention provides a network synchronization clock checking apparatus of a communication system comprising: a clock generator for generating a reference clock signal having a predetermined frequency; a network synchronization clock unit for counting the number of reference clock signals generated for a time corresponding to a predetermined period of an externally inputted network synchronization clock signal so as to calculate the value of the predetermined period of the network synchronization clock signal; a divided clock unit for generating a divided clock signal having the same frequency as the network synchronization clock signal based on the reference clock signal, and for counting the number of reference clock signals generated for a time corresponding to a predetermined period of the divided clock signal so as to calculate the value of the predetermined period of the divided clock signal; and a comparator for comparing the value of the period of the network synchronization clock unit with the value of the period of the divided clock unit so as to output an indication as to whether the network synchronization clock signal is normal or not.

When the input network synchronization clock signal is at least one of '1' and '0,' the network synchronization clock unit preferably resets the counting operation.

When the network synchronization clock signal is initially inputted or when the counting operation is reset, the network synchronization clock unit preferably delays the input network synchronization clock signal by a predetermined period of the reference clock signal, and outputs the delayed signal so that a predetermined time difference is maintained in order to calculate the value of the predetermined period of the network synchronization clock signal.

The network synchronization clock unit preferably calculates the value of the predetermined period of the network synchronization clock signal based on the number of the reference clock signals and the frequency of the reference clock signal.

The divided clock unit preferably calculates the value of the predetermined period of the divided clock signal based on the number of the reference clock signals and the frequency of the reference clock signal.

As a result of the comparison of the value of the predetermined period of the network synchronization clock unit with the value of the predetermined period of the divided clock unit, when the two values are the same, the comparator preferably determines that the network synchronization clock signal is normal, and when the two values are different, the comparator determines that the network synchronization clock signal is abnormal.

The network synchronization clock unit preferably includes: a clock delay unit for delaying the network synchronization by a predetermined period of the reference clock signal; a counter for counting the number of reference clock signals generated for a time corresponding to a predetermined period of the network synchronization clock signal so as to calculate the value of the predetermined period of the network synchronization clock signal; and a storing unit for storing the value of the predetermined period the network synchronization clock signal.

The divided clock unit preferably includes: a divider for generating the same divided clock signal as the network synchronization clock signal based on the reference clock signal; a counter for counting the number of reference clock signals generated for a time corresponding to a predetermined period of the divided clock signal so as to calculate the value of the predetermined period of the divided clock signal; and a storing unit for storing the value of the predetermined period of the divided clock signal.

When any one of at least two network synchronization clock signals is abnormal, the communication system preferably uses the other network synchronization clock signal which is determined to be normal.

A second aspect of the present invention provides a method of checking a network synchronization clock signal in a communication system, the method comprising the steps of: generating a reference clock signal having a predetermined frequency; generating a divided clock signal having the same frequency as the network synchronization clock signal based on the reference clock signal when at least one network synchronization clock signal is inputted externally; counting the number of reference clock signals generated for a time corresponding to a predetermined period of the divided clock signal, and calculating the value of the predetermined period of the divided clock signal; counting the number of reference clock signals generated for a time corresponding to a predetermined period of the network synchronization clock signal, and calculating the value of the predetermined period of the network synchronization clock signal; and comparing the value of the predetermined period of the network synchronization clock signal with the value of the predetermined period of the divided clock signal, and determining whether the input network synchronization clock signal is normal or not.

The step of counting the number of reference clock signals generated for the time corresponding to the predetermined period of the network synchronization clock signal preferably includes the step of resetting the counting operation when the input network synchronization clock signal is at least one of '1' and '0.'

The step of counting the number of reference clock signals generated for the time corresponding to the predetermined period of the network synchronization clock signal preferably includes the steps of, when the network synchronization clock signal is initially inputted or when the counting operation is reset, delaying the input network synchronization clock signal by a predetermined period of the reference clock signal, outputting the delayed signal, and performing the counting operation after a predetermined time difference is maintained so as to calculate the value of the predetermined period of the network synchronization clock signal.

The step of calculating the value of the predetermined period of the divided clock signal preferably includes the step of calculating the value of the predetermined period of the divided clock signal based on the number of reference clock signals and the frequency of the reference clock signal.

The step of calculating the value of the predetermined value of the network synchronization clock signal preferably includes the step of calculating the value of the predetermined period of the network synchronization clock signal based on the number of reference clock signals and the frequency of the reference clock signal.

The step of determining whether the network synchronization clock signal is normal or not preferably includes the steps of determining that the network synchronization clock signal is normal when the value of the period of the network synchronization clock signal is equal to the value of the period of the divided clock signal as a result of the comparison of the two values, and determining that the network synchronization clock signal is abnormal when the two values are different.

When any one of at least two network synchronization clock signals is determined to be abnormal, the method preferably further includes the step of selecting the other network synchronization clock signal which is determined to be normal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a flowchart illustrating the operation of a network synchronization checking apparatus according to an exemplary embodiment of the present invention.

DETAILED DESCRIPTION OF THE INVENTION

An apparatus and method for checking a network synchronization clock signal in a communication system according to the present invention will now be described more fully hereinafter with reference to the accompanying drawings, in which exemplary embodiments of the invention are shown.

Figure 1:
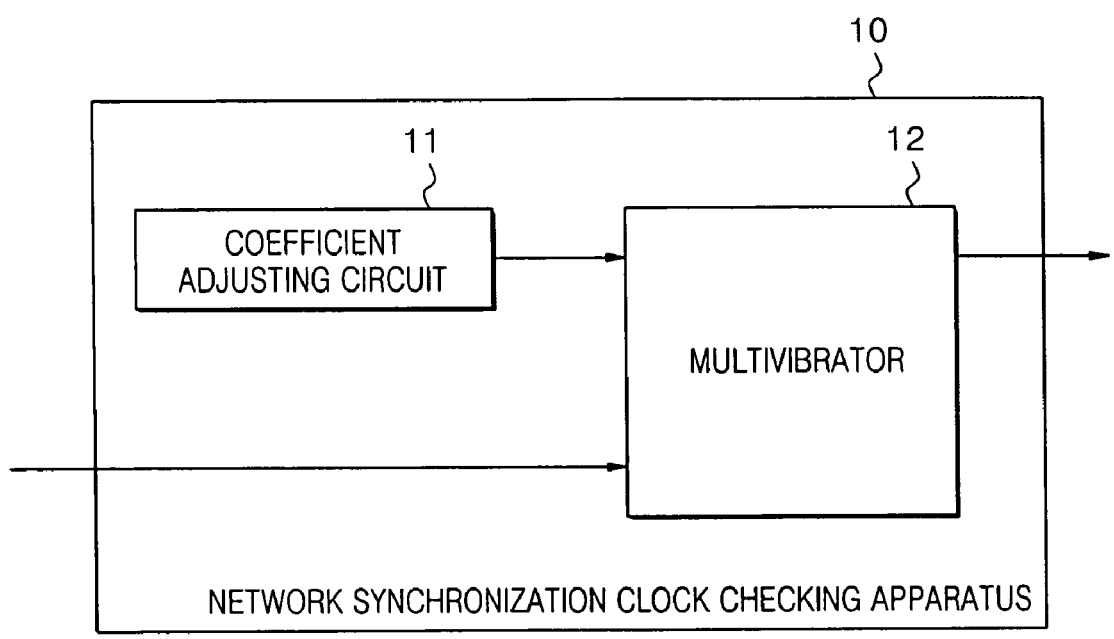
FIG. 1 is a circuit diagram of a network synchronization checking apparatus of a communication system.

FIG. 1 is a circuit diagram of a network synchronization clock checking apparatus of a communication system.

Referring to FIG. 1, a network synchronization clock checking apparatus 10 of the communication system includes a coefficient adjusting circuit 11 and a multivibrator 12.

In this regard, the coefficient adjusting circuit 11 is embodied by a resistor and a condenser (not shown). The coefficient adjusting circuit 11 generates a predetermined coefficient through the resistor and the condenser so that a clock signal, which is supposed to descend from '1' to '0,' remains '1.'

The multivibrator 12 receives a network synchronization clock signal which is received by the communication system, checks the network synchronization clock signal, and outputs the result.

The network synchronization clock checking apparatus 10 having the above-described circuit configuration operates the coefficient adjusting circuit 11 and generates a predetermined coefficient until a network synchronization clock signal inputted to the multivibrator 12 is lowered from '1' to '0' and then elevated from '0' to '1' again, so that the network synchronization clock signal inputted to the multivibrator 12 remains '1.' That is, the network synchronization clock checking apparatus 10 allows the multivibrator 12 to keep outputting '1' when the network synchronization clock signal is normally inputted to the multivibrator 12 without a break.

Furthermore, the network synchronization clock checking apparatus 10 allows the multivibrator 12 to output '0' when the network synchronization clock signal is abnormally interrupted.

However, the network synchronization clock checking apparatus 10 of the communication system senses only a level transition made by the network synchronization clock signal inputted to the multivibrator 12, and determines whether the network synchronization clock signal is normal or not. Accordingly, even if the inputted network synchronization clock signal is abnormal, the network synchronization clock checking apparatus 10 may determine that the clock signal is normal on the basis of a level transition.

Moreover, because the coefficient adjusting circuit 11 of the network synchronization clock checking apparatus 10 includes the resistor and the condenser, an error in the coefficient obtained through the resistor and the condenser may occur due to the defects and erroneous values of respective components.

Figure 2:
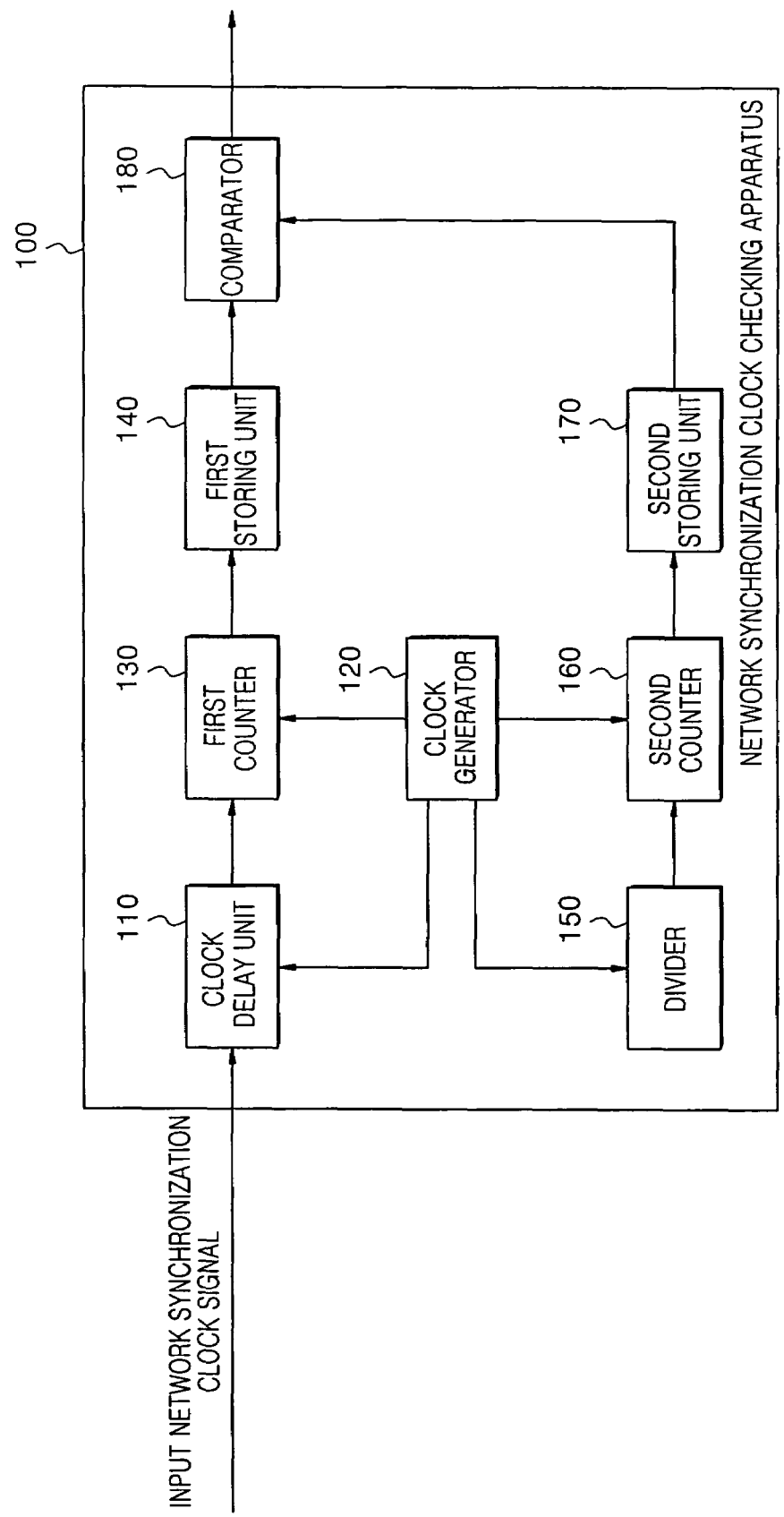
FIG. 2 is a block diagram of a network synchronization checking apparatus according to an exemplary embodiment of the present invention.

FIG. 2 is a block diagram of a network synchronization checking apparatus according to an exemplary embodiment of the present invention.

Referring to FIG. 2, a network synchronization clock checking apparatus 100 of a communication system includes a clock delay unit 110, a clock generator 120, a first counter 130, a first storing unit 140, a divider 150, a second counter 160, a second storing unit 170, and a comparator 180.

The clock delay unit 110 of the network synchronization clock checking apparatus 100 delays an inputted system network synchronization clock signal (hereinafter, "network synchronization clock signal") and output a delayed signal. Also, when the input network synchronization clock signal is '1,' the clock delay unit 110 resets a first count which will be described later.

The clock generator 120 generates a reference clock signal having a predetermined frequency.

The first counter 130 counts the number of reference clock signals inputted from the clock generator 120 for a time corresponding to a period of the network synchronization clock signal inputted from the clock delay unit 110, and calculates the period value of the network synchronization clock signal based on the number of reference clock signals and the frequency of the reference clock signal.

The first storing unit 140 stores the period value of the network synchronization clock signal.

The divider 150 generates a divided clock signal having the same frequency as the predetermined frequency of the network synchronization clock signal inputted from the clock generator 120.

The second counter 160 counts the number of reference clock signals inputted from the clock generator 120 for a time corresponding to a period of the divided clock signal inputted from the divider 150, and calculates the period value of the divided clock signal based on the number of reference clock signals and the frequency of the reference clock signal.

The second storing unit 170 stores the period value of the divided clock signal.

The comparator 180 compares the period value stored in the first storing unit 140 with the period value stored in the second storing unit 170, and determines whether the network synchronization clock signal is normal or not.

The operation of the network synchronization clock checking apparatus 100 having the above-described configuration will now be described in more detail.

At the outset, the clock generator 120 of the network synchronization clock checking apparatus 100 generates a clock signal having a preset frequency, and outputs the clock signal to the clock delay unit 110, the first counter 130, the divider 150, and the second counter 160.

The clock delay unit 110 receives the network synchronization clock signal and delays the inputted network synchronization clock signal by one period of a reference clock signal outputted from the clock generator 120. Also, the clock delay unit 110 outputs the delayed network synchronization clock signal to the first counter 130.

After the clock delay unit 110 outputs the delayed network synchronization clock signal to the first counter 130, when the input network synchronization clock signal is '1,' the clock delay unit 110 outputs a reset signal to the first counter 130. In this regard, since the network synchronization clock signal becomes '1' when the network synchronization clock signal is repeated once every period, the clock delay unit 110 outputs the reset signal to the first counter 130 once every period of the network synchronization clock signal.

When the first counter 130 receives the network synchronization clock signal from the clock delay unit 110, the first counter 130 counts the number of reference clock signals inputted from the clock generator 120 for a time in which the network synchronization clock signal is inputted. Also, when the first counter 130 receives the reset signal from the clock delay unit 110, the first counter 130 finishes a counting operation and calculates the value of one period of the network synchronization clock signal based on the number of reference clock signals counted before the reset signal is inputted and the frequency of the reference clock signal. The first counter 130 outputs the value of one period of the network synchronization clock signal to the first storing unit 140.

The first storing unit 140 receives the value of one period of the network synchronization clock signal from the first counter 130, stores the value of one period of the network synchronization clock signal, and outputs the value of one period of the network synchronization clock signal to the comparator 180.

Meanwhile, when the divider 150 receives a predetermined clock signal, the divider 150 generates the same clock signal as the network synchronization clock signal based on the inputted predetermined clock signal. That is, the divider 150 divides the input clock signal to obtain the same frequency as the network synchronization clock signal.

When the divider 150 generates the same clock signal (hereinafter, "divided clock signal") as the network synchronization clock signal, the divider 150 outputs the divided clock signal to the second counter 160.

When the second counter 160 receives the divided clock signal from the divider 150, the second counter 160 counts the number of reference clock signals inputted from the clock generator 120 for a time corresponding to one period of the inputted divided clock signal, and calculates the value of one period of the divided clock signal based on the number of reference clock signals and the frequency of the reference clock signal. Also, the second counter 160 outputs the value of one period of the divided clock signal to the second storing unit 170.

The second storing unit 170 receives the value of one period of the divided clock signal from the second counter 160, stores the value of one period of the divided clock signal, and outputs the value of one period of the divided clock signal to the comparator 180.

The comparator 180 receives the value of one period of the network synchronization clock signal and the value of one period of the divided clock signal from the first and second storing units 140 and 170, respectively, and compares the two values. As a result of the comparison, when the value of one period of the network synchronization clock signal is equal to the value of one period of the divided clock signal, the comparator 180 determines that the network synchronization clock signal is normal, and outputs '1'. When the value of one period of the network synchronization clock signal is not equal to the value of one period of the divided clock signal, the comparator 180 determines that the network synchronization clock signal is abnormal, and outputs '0.'

After the network synchronization clock checking apparatus 100 checks one period of the input network synchronization clock signal, an operation of delaying the network synchronization clock signal by one period of a clock signal outputted from the clock generator 120 and an operation of calculating the value of one period of the network synchronization clock signal are repeated for the next period. Thus, the network synchronization clock checking apparatus 100 determines whether each period of the input network synchronization clock signal is normal or not.

Meanwhile, the reason that the clock delay unit 110 delays the input network synchronization clock signal by one period of the clock signal outputted from the clock generator 120 is that a predetermined time difference is provided after the first counter 130 counts the number of reference clock signals for one period, and before the first counter 130 counts the number of reference clock signals for the next period, in order to prevent an error that may occur when the first counter 130 is pressed for time.

As described above, after the network synchronization clock checking apparatus 100 generate a divided clock signal having the same frequency as the inputted network synchronization clock signal, the network synchronization clock checking apparatus 100 compares the value of one period of the network synchronization clock signal to the value of one period of the divided clock signal, and determines whether the network synchronization clock signal is normal or not.

Furthermore, the communication system includes at least one port (not shown) which externally receives a network synchronization clock signal, at least one network synchronization clock checking apparatus 100 which checks the synchronization of the network synchronization clock signal inputted to each port, and a controller (not shown). When a network synchronization clock checking apparatus 100 determines that an input network synchronization clock signal is abnormal and outputs the result, the controller which controls the respective network synchronization clock checking apparatuses 100 can lead the communication system to be synchronized with a network synchronization clock signal inputted to another network synchronization clock checking apparatus 100 which determines that its inputted network synchronization clock signal is normal and outputs the result.

Figure 3:
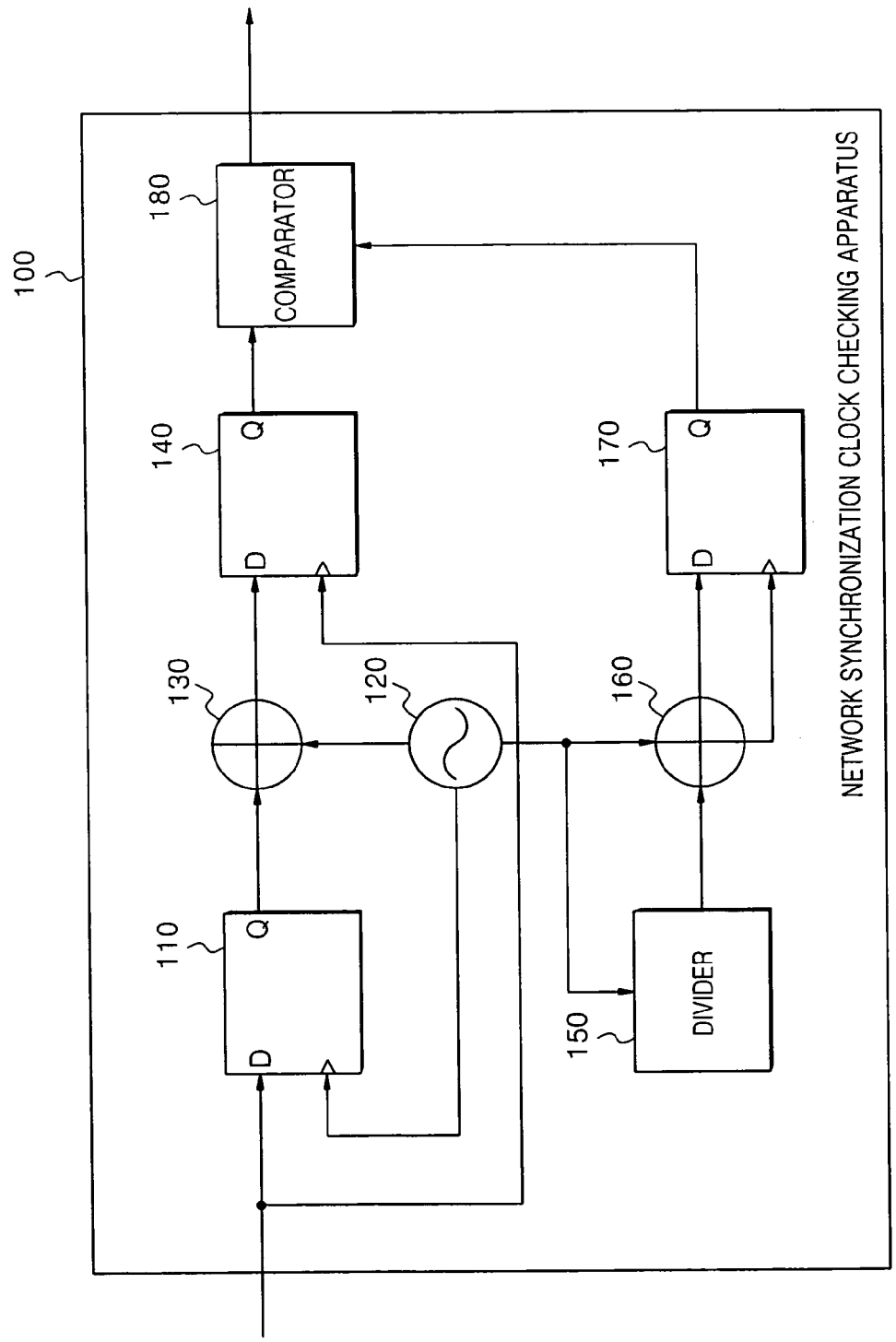
FIG. 3 is a circuit diagram of a network synchronization checking apparatus according to an exemplary embodiment of the present invention.

FIG. 3 is a circuit diagram of a network synchronization clock checking apparatus according to an exemplary embodiment of the present invention.

Referring to FIG. 3, a circuit of the network synchronization clock checking apparatus 100 is embodied by digital logic including a first flip-flop 110 which delays an input network synchronization clock signal, an oscillator 120 which generates a predetermined reference clock signal, a first counter 130 which counts the period of the network synchronization clock signal, a second flip-flop 140 which stores the value of one period of the network synchronization clock signal, a divider 150 which divides a reference clock signal generated by the oscillator 120 to obtain the same frequency as the network synchronization clock signal, a second counter 160 which counts the period of the clock signal divided by the divider 150, a third flip-flop 170 which stores the value of one period of the divided clock signal, and a comparator 180 which compares the value of one period of the network synchronization clock signal to the value of one period of the divided clock signal.

Since the latter elements are used to implement corresponding components of the arrangement shown in FIG. 2, identical reference numerals are used in FIGS. 2 and 3 to designate components of FIG. 2 and their respective implementations in FIG. 3.

The operation of the network synchronization clock checking apparatus having the above-described circuit configuration will now be briefly described.

At the outset, the oscillator 120 of the network synchronization clock checking apparatus 100 generates a reference clock signal having a preset frequency, and outputs the reference clock signal to the first flip-flop 110, the first counter 130, the divider 150, and the second counter 160.

When the first flip-flop 110 receives a network synchronization clock signal, the first flip-flop 110 delays the network synchronization clock signal by one period of the reference clock signal outputted from the oscillator 120, and outputs the delayed network synchronization clock signal to the first counter 130.

Furthermore, after the first flip-flop 110 outputs the network synchronization clock signal to the first counter 130, when the input network synchronization clock signal is '1,' the first flip-flop 110 outputs a reset signal to the first counter 130.

When the first counter 130 receives the network synchronization clock signal from the first flip-flop 110, the first counter 130 counts the number of reference clock signals inputted from the oscillator 120 for a time in which the network synchronization clock signal is inputted. Also, when the first counter 130 receives the reset signal from the first flip-flop 110, the first counter 130 finishes a counting operation and calculates the value of one period of the network synchronization clock signal based on the number of reference clock signals counted before the reset signal is inputted and the frequency of the reference clock signal.

The first counter 130 outputs the value of one period of the network synchronization clock signal to the first storing unit 140 so that the first storing unit 140 stores the value of one period of the network synchronization clock signal.

Meanwhile, when the divider 150 receives the reference clock signal from the oscillator 120, the divider 150 divides the input clock signal, generates the same clock signal (i.e., a divided clock signal) as the network synchronization clock signal, and outputs the divided clock signal to the second counter 160.

When the second counter 160 receives the divided clock signal from the divider 150, the second counter 160 counts the number of reference clock signals inputted from the oscillator 120 for a time corresponding to one period of the inputted divided clock signal, and calculates the value of one period of the divided clock signal based on the number of reference clock signals and the frequency of the reference clock signal.

Also, the second counter 160 outputs the value of one period of the divided clock signal to the second storing unit 170 so that the second storing unit 170 stores the value of one period of the divided clock signal.

The comparator 180 receives the value of one period of the network synchronization clock signal and the value of one period of the divided clock signal from the first and second storing units 140 and 170, respectively, and compares the two values. As a result of the comparison, when the two values are the same, the comparator 180 determines that the network synchronization clock signal is normal and outputs '1.' However, when the two values are different, the comparator 180 determines that the network synchronization clock signal is abnormal and outputs '0.'

FIG. 4 is a flowchart illustrating the operation of a network synchronization checking apparatus according to an exemplary embodiment of the present invention.

Referring to FIG. 4, initially, the network synchronization clock checking apparatus 100 determines whether a network synchronization clock signal is externally inputted or not (S101).

The network synchronization clock checking apparatus 100 generates a reference clock signal having a predetermined frequency if the network synchronization clock signal is externally inputted (S102).

The network synchronization clock checking apparatus 100 generates a divided clock signal having the same frequency as the externally inputted network synchronization clock signal based on the reference clock (S103).

Furthermore, the network synchronization clock checking apparatus 100 counts the number of reference clock signals generated for a time corresponding to one period of the divided clock signal (S104).

The network synchronization clock checking apparatus 100 calculates the value of one period of the divided clock signal based on the number of reference clock signals and the frequency of the reference clock signal, and stores the value of one period of the divided clock signal (S105).

Thereafter, the network synchronization clock checking apparatus 100 delays the externally inputted network synchronization clock signal by one period of the reference clock signal (S106).

The network synchronization clock checking apparatus 100 counts the number of reference clock signals generated for a time corresponding to one period of the externally inputted network synchronization clock signal (S107).

Thereafter, the network synchronization clock checking apparatus 100 calculates the value of one period of the network synchronization clock signal based on the number of reference clock signals and the frequency of the reference clock signal, and stores the value of one period of the network synchronization clock signal (S108).

The network synchronization clock checking apparatus 100 compares the value of one period of the divided clock signal to the value of one period of the network synchronization clock signal (S109). If the two values are the same, the network synchronization clock checking apparatus 100 determines that the network synchronization clock signal is normal and outputs '1' (S110).

However, if the value of one period of the divided clock signal is not equal to the value of one period of the network synchronization clock signal, the network synchronization clock checking apparatus 100 determines that the network synchronization clock signal is abnormal and outputs '0' (S111).

In the above-described process, the network synchronization clock checking apparatus 100 repeatedly checks the value of one period of the externally inputted network synchronization clock signal.

Meanwhile, although it is described with respect to the present embodiment that, when the inputted network synchronization clock signal is '1,' a counting operation is reset, it is possible in another exemplary embodiment that, even if the network synchronization clock signal is '0,' the counting operation may be reset.

Furthermore, in the present invention, the network synchronization clock checking apparatus 100 determines whether the network synchronization clock signal is normal or not for each period of the network synchronization clock signal in order to enhance the reliability of a clock checking process. However, the network synchronization clock checking apparatus 100 may check a predetermined period of the network synchronization clock signal at once if necessary. Also, when the network synchronization clock checking apparatus 100 delays an externally inputted network synchronization clock signal, the network synchronization clock signal may be delayed by a predetermined period in contrast to the present embodiment.

In addition, as a result of the comparison of the value of one period of the network synchronization clock signal with the value of one period of the divided clock signal, when the two values are the same, the network synchronization clock checking apparatus 100 may output '0,' and when the two values are different, the network synchronization clock checking apparatus 100 may output '1.'

According to the present invention as described above, the network synchronization clock checking apparatus generates the same divided clock signal as an externally inputted network synchronization clock signal, compares the value of one period of the network synchronization clock signal to the value of one period of the divided clock signal, and determines whether the network synchronization clock signal is normal or not. As a result, the reliability of a clock checking method can be enhanced.

While the present invention has been described with reference to exemplary embodiments thereof, it will be understood by those skilled in the art that various changes in form and detail may be made therein without departing from the scope of the present invention as defined by the following claims.

What is claimed is:

1. A network synchronization clock checking apparatus of a communication system, comprising:
   a clock generator for generating a reference clock signal having a predetermined frequency;
   a network synchronization clock unit for counting a number of reference clock signals generated for a time corresponding to a predetermined period of an externally input network synchronization clock signal so as to calculate a value of the predetermined period of the externally input network synchronization clock signal;
   a divided clock unit for generating a divided clock signal having a same frequency as the externally input network synchronization clock signal based on the reference clock signal, and for counting a number of reference clock signals generated for a time corresponding to a predetermined period of the divided clock signal so as to calculate a value of the predetermined period of the divided clock signal; and
   a comparator for comparing the value of the predetermined period of the externally input network synchronization clock signal to the value of the predetermined period of the divided clock signal so as to output an indication of whether the externally input network synchronization clock signal is normal.

2. The apparatus according to claim 1, wherein when the externally input network synchronization clock signal is at least one of '1' and '0,' the network synchronization clock unit resets the counting of the number of reference clock signals.

3. The apparatus according to claim 2, wherein when the externally input network synchronization clock signal is initially input, the network synchronization clock unit delays the externally input network synchronization clock signal by a predetermined period of the reference clock signal to produce a delayed signal, and outputs the delayed signal so that a predetermined time difference is maintained for calculating the value of the predetermined period of the externally input network synchronization clock signal.

4. The apparatus according to claim 2, wherein when the counting of the number of reference clock signals is reset, the network synchronization clock unit delays the externally input network synchronization clock signal by a predetermined period of the reference clock signal to produce a delayed signal, and outputs the delayed signal so that a predetermined time difference is maintained for calculating the value of the predetermined period of the externally input network synchronization clock signal.

5. The apparatus according to claim 1, wherein the network synchronization clock unit calculates the value of the predetermined period of the externally input network synchronization clock signal based on the number of the reference clock signals counted corresponding to the predetermined period of the network synchronization clock signal and the predetermined frequency of the reference clock signal.

6. The apparatus according to claim 1, wherein the divided clock unit calculates the value of the predetermined period of the divided clock signal based on the number of the reference clock signals counted corresponding to the predetermined period of the divided clock signal and the predetermined frequency of the reference clock signal.

7. The apparatus according to claim 1, wherein when the comparator determines that the value of the predetermined period of the externally input network synchronization clock signal and the value of the predetermined period of the divided clock signal are the same, the comparator determines that the externally input network synchronization clock signal is normal, and when the comparator determines that the value of the predetermined period of the externally input network synchronization clock signal and the value of the predetermined period of the divided clock signal are different, the comparator determines that the externally input network synchronization clock signal is abnormal.

8. The apparatus according to claim 1, wherein the network synchronization clock unit comprises:
 a clock delay unit for delaying the externally input network synchronization clock signal by a predetermined period of the reference clock signal;
 a counter for counting the number of reference clock signals generated for a time corresponding to the predetermined period of the externally input network synchronization clock signal so as to calculate the value of the predetermined period of the externally input network synchronization clock signal; and
 a storing unit for storing the value of the predetermined period of the externally input network synchronization clock signal.

9. The apparatus according to claim 1, wherein the divided clock unit comprises:
 a divider for generating the divided clock signal having the same frequency as the externally input network synchronization clock signal based on the reference clock signal;
 a counter for counting the number of reference clock signals generated for the time corresponding to the predetermined period of the divided clock signal so as to calculate the value of the predetermined period of the divided clock signal; and
 a storing unit for storing the value of the predetermined period of the divided clock signal.

10. The apparatus according to claim 1, wherein when any one of at least two externally input network synchronization clock signals comprised of the externally input network synchronization clock signal and another externally input network synchronization clock signal is abnormal, the communication system uses one of said at least two externally input network synchronization clock signals which is determined to be normal.

11. A method of checking a network synchronization clock signal in a communication system, the method comprising the steps of:
 generating a reference clock signal having a predetermined frequency;
 generating a divided clock signal having a same frequency as the network synchronization clock signal based on the reference clock signal when at least one network synchronization clock signal is input from an external source;
 counting a number of reference clock signals generated for a time corresponding to a predetermined period of the divided clock signal, and calculating a value of the predetermined period of the divided clock signal;
 counting a number of reference clock signals generated for a time corresponding to a predetermined period of the network synchronization clock signal, and calculating a value of the predetermined period of the network synchronization clock signal; and
 comparing the value of the predetermined period of the network synchronization clock signal to the value of the predetermined period of the divided clock signal, and determining whether the input network synchronization clock signal is normal.

12. The method according to claim 11, wherein the step of counting the number of reference clock signals generated for the time corresponding to the predetermined period of the network synchronization clock signal comprises a step of resetting the counting operation when said at least one network synchronization clock signal input from the external source is at least one of '1' and '0.'

13. The method according to claim 12, wherein the step of counting the number of reference clock signals generated for the time corresponding to the predetermined period of the network synchronization clock signal comprises the steps of:
 when the network synchronization clock signal is initially input, delaying the input network synchronization clock signal by a predetermined period of the reference clock signal to produce a delayed signal;
 outputting the delayed signal; and
 performing the counting of the number of reference clock signals after a predetermined time difference is maintained so as to calculate the value of the predetermined period of the network synchronization clock signal.

14. The method according to claim 12, wherein the step of counting the number of reference clock signals generated for the time corresponding to the predetermined period of the network synchronization clock signal comprises the steps of:
 when the counting of the number of reference clock signals is reset, delaying the input network synchronization clock signal by a predetermined period of the reference clock signal to produce a delayed signal;
 outputting the delayed signal; and
 performing the counting of the number of reference clock signals after a predetermined time difference is maintained so as to calculate the value of the predetermined period of the network synchronization clock signal.

15. The method according to claim 11, wherein the step of calculating the value of the predetermined period of the divided clock signal comprises the step of calculating the value of the predetermined period of the divided clock signal based on the number of the reference clock signals counted corresponding to the predetermined period of the divided clock signal and the frequency of the reference clock signal.

16. The method according to claim 11, wherein the step of calculating the value of the predetermined period of the network synchronization clock signal comprises calculating the value of the predetermined period of the network synchronization clock signal based on the number of the reference clock signals counted corresponding to the predetermined period of the network synchronization clock signal and the frequency of the reference clock signal.

17. The method according to claim 11, wherein the step of determining whether the network synchronization clock signal is normal comprises the steps of:
    determining that the network synchronization clock signal is normal when the value of the predetermined period of the network synchronization clock signal is equal to the value of the predetermined period of the divided clock signal: and
    determining that the network synchronization clock signal is abnormal when the value of the predetermined period of the network synchronization clock signal is not equal to the value of the predetermined period of the divided clock signal.

18. The method according to claim 11, further comprising the step, when at least one network synchronization clock signal is determined to be abnormal, of selecting a network synchronization clock signal which is determined to be normal.

19. A synchronization clock signal checking apparatus, the apparatus comprising:
    a clock generator providing a reference clock signal having a predetermined frequency;
    a synchronizing clock unit making a count of a number of reference clock signals generated for a time corresponding to a predetermined period of the synchronization clock signal, and indicating a value of the predetermined period of the synchronization clock signal;
    a divided clock unit providing a divided clock signal having a same frequency as the synchronization clock signal based on the reference clock signal when at least one synchronization clock signal is input from an external source, making a count of a number of reference clock signals generated for a time corresponding to a predetermined period of the divided clock signal, and indicating a value of the predetermined period of the divided clock signal; and
    a third unit comparing the value of the predetermined period of the synchronization clock signal to the value of the predetermined period of the divided clock signal, and determine whether the input synchronization clock signal is normal.

20. The synchronization clock signal checking apparatus of claim 19, comprised of making the count of the number of reference clock signals generated for the time corresponding to the predetermined period of the synchronization clock signal comprises:
    when the synchronization clock signal is initially input, delaying the synchronization clock signal by a predetermined period of the reference clock signal to produce a delayed signal;
    outputting the delayed signal; and
    performing the counting of the number of reference clock signals after a predetermined time difference is maintained so as to determine the value of the predetermined period of the synchronization clock signal.

* * * * *